United States Patent [19]

Malbrel et al.

[11] Patent Number: 5,439,058

[45] Date of Patent: Aug. 8, 1995

[54] METHOD OF CLEANING AN OIL OR GAS WELL

[75] Inventors: Christophe A. Malbrel, New York; Reza Hashemi, Sea Cliff, both of N.Y.

[73] Assignee: Pall Corporation, East Hills, N.Y.

[21] Appl. No.: 208,744

[22] Filed: Mar. 11, 1994

[51] Int. Cl.⁶ .................... E21B 37/06; E21B 43/28
[52] U.S. Cl. ........................ 166/300; 166/304; 166/312; 166/384; 210/732; 210/733; 210/747
[58] Field of Search ............... 166/311, 312, 270, 300, 166/310, 304; 210/733, 732, 727, 728, 729, 716, 717, 747; 252/8.551

[56] References Cited

U.S. PATENT DOCUMENTS

| | | | |
|---|---|---|---|
| 1,873,083 | 8/1932 | Walker | 166/310 X |
| 2,429,593 | 10/1947 | Case | 166/310 X |
| 2,546,586 | 3/1951 | Cross | 166/310 |
| 2,548,616 | 4/1951 | Priestman et al. | |
| 2,567,009 | 9/1951 | Calhoun et al. | |
| 3,116,781 | 1/1964 | Rugeley et al. | |
| 3,182,877 | 5/1965 | Slator et al. | 226/172 |
| 3,285,485 | 11/1966 | Slator | 226/172 |
| 3,373,818 | 3/1968 | Rike et al. | 166/77 |
| 3,738,437 | 6/1973 | Scheuerman | 175/71 X |
| 3,884,302 | 5/1975 | Messenger | 166/291 |
| 4,127,174 | 11/1978 | Sharpe et al. | 166/291 |
| 4,284,140 | 8/1981 | Sydansk et al. | 166/291 |
| 4,321,968 | 3/1982 | Clear | 166/275 |
| 4,380,268 | 4/1983 | Martin | 166/304 |
| 4,451,377 | 5/1984 | Luxemburg | 210/708 |
| 4,476,930 | 10/1984 | Watanabe | 166/279 |
| 4,572,786 | 2/1986 | Endo | 210/188 |
| 4,599,117 | 7/1986 | Luxemburg | 210/708 X |
| 4,702,844 | 10/1987 | Flesher et al. | 210/733 |
| 4,765,913 | 8/1988 | Featherstone | 210/714 |

OTHER PUBLICATIONS

"Pall Filtration Services for Completion, Workover, and Stimulation" Pall Well Technology, 1987, pp. 2–15.

"Coiled Tubing Handbook: Operations and Services Parts 1, 4, 8, and 13" Gulf Pub. Co., 1993.

"Versafloc TM Polymers Reduce Your Displacement Costs" Pall Well Technology, Mar. 1994, 29 pages total.

"Polymeric Flocculants Prove Most Effective Chemicals for Well-Bore Cleanup Operations" Holland et al., Soc. Petr. Eng. 1994.

"Versafloc TM Polymers Reduce Your Displacement Costs" Pall Well Technology Filtration Service Co., 1994, pp. 1–8.

*Primary Examiner*—Stephen J. Novosad
*Attorney, Agent, or Firm*—Leydig, Voit & Mayer

[57] ABSTRACT

A method of cleaning an oil or gas well includes mixing a caustic with a saline solution to precipitate hydroxide species from the saline solution and form a milky suspension. The suspension is contacted with contaminants in a well bore to entrap the contaminants. A polymeric flocculant is then mixed with the suspension in the well bore to aggregate the hydroxide species and the entrapped contaminants into flocs. The flocs are extremely strong and can withstand the highly turbulent flow existing in the well bore and can be readily flushed out of the well bore.

53 Claims, No Drawings

METHOD OF CLEANING AN OIL OR GAS WELL

BACKGROUND OF THE INVENTION

1. Field of the Invention

This invention relates to a method for cleaning wells for the production of oil or gas, collectively referred to as oil wells.

2. Description of the Related Art

During completion or workover of an oil well, it is necessary to clean out the well bore before it can be used to carry oil or gas up to the well head. For example, after drilling, perforating, or cementing operations, a large amount of particulate matter removed from the sides of the well bore during such operations remains in the well bore, and it is desirable to remove such particulate matter from inside the well bore prior to production.

A typical method of removing particulate matter from a well bore is to circulate a liquid, referred to as a completion fluid, through the well bore to carry the particulate matter to the surface. A completion fluid commonly comprises an aqueous saline solution, such as sea water or a man-made brine, and the term here is used to include both displacement fluids and completion brines. The drag force acting on particulate matter suspended in a well bore increases with the square of the particle size, and an increased drag force increases the sweeping efficiency of the completion fluid, i.e., the ability of the completion fluid to remove particles from the well. Therefore, the larger the size of the particulate matter, the more efficiently can well cleaning be performed.

It has been found that even under turbulent flow conditions such as generally exist during oil well cleaning, a polymeric flocculant has the ability to agglomerate contaminants into large, low density flocs, which can be readily carried to the surface by the completion fluid. The larger and lighter the flocs, the more efficiently they can be flushed from the well bore. Thus, it is desirable to make the flocs as large and as light as possible.

SUMMARY OF THE INVENTION

Accordingly, it is an object of the present invention to provide a method for efficiently cleaning an oil well which can increase the effectiveness of a polymeric flocculant by enabling the flocculant to form larger and lighter flocs.

It is another object of the present invention to provide a method for cleaning an oil well which is insensitive to the type of contaminants present in a well bore.

In a cleaning method according to the present invention, a caustic is mixed with a saline solution to precipitate hydroxide species. The hydroxide species are then contacted with contaminants present in a well bore to entrap the contaminants. A polymeric flocculant is then mixed with the hydroxide species and the contaminants in the well bore to form a floc containing the hydroxide species and the contaminants. The floc can then be flushed from the well bore to effectively remove the contaminants.

The saline solution can be a conventional completion fluid (e.g., a displacement fluid or a completion brine, including sea water) used in cleaning oil wells. The caustic may be mixed with the saline solution either outside or inside the well bore and may be in the form of a solid or an aqueous solution.

Due to the addition of the caustic to the saline solution, the flocs created by the polymeric flocculant are larger and lighter than flocs which could be formed in the absence of the caustic. Therefore, the flocs and the contaminants contained therein can more readily be brought to the surface and discharged from the well head. As a result, the amount of completion fluid and/or the length of time required to clean a well can be greatly reduced, providing significant cost savings. Furthermore, the presence of the hydroxide species in the well bore makes flocculation more complete, i.e., much fewer particles are left out of the flocs.

A cleaning method according to the present invention is particularly suitable for use in cleaning an oil well bore, but it can also be employed for other applications, such as to remove oil droplets or oily solids from waste water in a tank.

DESCRIPTION OF PREFERRED EMBODIMENTS

A cleaning method according to the present invention can be used at any stage during the life of an oil well, such as during completion or during workover, and with or without production tubing being present in the well bore. Most commonly, however, it will be employed at a stage in which production tubing has been installed in the well bore, and oil, drilling mud, and large particulate contaminants have already been flushed out of the well bore by a completion fluid. The well need not be of any particular type, and can be an off-shore well or a land-based well.

In carrying out one embodiment of the method, an aqueous caustic solution is mixed with an aqueous saline solution to form a suspension of hydroxide species. The suspension visually appears milky, i.e., cloudy, and therefore will be referred to as a milky suspension, although the color of the suspension may be whitish, orange, or some other color, depending upon the type of hydroxide species in the suspension. The suspension is either formed within the well bore, or it is introduced into the well bore after being formed outside the well bore to contact and entrap contaminants contained in the well bore. A flocculant mixture containing a polymeric flocculant is then added to the well bore to agglomerate the hydroxide species in the suspension and the entrapped contaminants contained in the suspension. The resulting flocs are then carried to the well head by drag forces produced by fluid circulated through the well bore.

The saline solution will typically be an aqueous completion fluid such as commonly used in the cleaning of oil wells, such as sea water and man-made brines, including aqueous solutions of chlorides such as potassium chloride, calcium chloride, and ammonium chloride; bromides such as sodium bromide, potassium bromide, calcium bromide, and zinc bromide; and carbonates such as potassium carbonate. The completion fluid is chosen in accordance with the character of the well and the type of contaminants which need to be removed from the well bore. For off-shore wells, sea water is the most commonly used completion fluid. However, the saline solution need not be a conventional completion fluid and can be any aqueous saline solution containing salts which undergo a condensation reaction to precipitate hydroxide species when the caustic solution is mixed therewith.

The caustic solution can be selected in accordance with the nature of the saline solution and can be any substance capable of precipitating ions from the saline solution to form insoluble hydroxide species. When the saline solution is sea water or any of the above-described commonly used completion fluids, examples of a suitable caustic solution are aqueous solutions of sodium hydroxide, potassium hydroxide, ammonium hydroxide, or lithium hydroxide. Of these, sodium hydroxide and potassium hydroxide are preferred because they are more economical.

The concentration of the salts in the saline solution will vary according to the characteristics of the well bore and economic considerations. For the purposes of the present invention, the concentration of the salt in the saline solution is preferably at least 0.1% and more preferably at least 2%.

The concentration of the caustic solution will depend upon the chemistry of the saline solution (its composition, the salt concentration, the pH). The concentration of the caustic solution is preferably high enough to form a milky suspension when added to the saline solution. The suitable concentration can be determined experimentally by preparing a plurality of samples of the saline solution to be used, and then adding progressively stronger concentrations of the caustic solution to the different samples until a concentration is reached at which a dilute milky suspension is produced in a sample.

The hydroxide species present in the suspension will depend upon the salts present in the saline solution. For example, when sodium hydroxide or potassium hydroxide is mixed with sea water, the resulting suspension may contain hydroxide species such as calcium hydroxide, zinc hydroxide, magnesium hydroxide, aluminum hydroxide, and iron hydroxide which precipitate from the ions present in the sea water.

The caustic solution is preferably mixed with the saline solution prior to being contacted with the flocculant mixture. The mixing can be performed either before or after the caustic solution is introduced into the well bore. For example, the caustic solution can be mixed with a saline solution in a mixing tank on the surface, and the resulting mixture can be pumped downhole. Alternatively, the caustic solution can be pumped down production tubing into a well bore already containing the saline solution, and mixing between the caustic solution and the saline solution will commence as soon as the caustic solution is introduced into the production tubing. Mixing the caustic solution and the saline solution in a mixing tank on the surface has the advantage that the mixing conditions can be more carefully controlled to ensure a thorough mixture. However, care must be taken that the milky suspension of hydroxide species is not allowed to settle to the bottom of the mixing tank without being introduced into the well bore. Accordingly, if a mixing tank is used, the contents thereof are preferably thoroughly agitated during and after the mixing process.

Alternatively, the caustic solution can be introduced into the well bore by a pump without being previously mixed with the saline solution. Usually, the caustic solution will be introduced into the well bore after completion fluid has been circulating through the well bore for some time in order to remove oil, drilling mud, and large particulate contaminants. For example, approximately one well volume of the completion fluid may be circulated through the well bore before the caustic solution is introduced. Therefore, at the time of introducing the caustic solution, the well bore will already be filled with a saline solution in the form of the completion fluid. Accordingly, the caustic solution can simply be pumped down into the well bore, and turbulent flow within the well bore can be employed to produce thorough mixing of the caustic solution and the completion fluid.

Instead of employing a caustic solution, it is also possible to employ a solid caustic in the form of a powder or pellet, for example, which is mixed with the saline solution in a mixing tank outside the well bore and then introduced into the well bore together with the saline solution. This method may be simpler than preparing an aqueous caustic solution in advance.

When the caustic solution contacts the salts in the saline solution, a milky suspension of metal and/or nonmetal hydroxide species is formed. This suspension contains hydroxide species which attract and/or entrap contaminants present in the well bore, such as particulate contaminants including sand particles or other solid contaminants, or oily substances such as oil droplets or oily solids. The subsequent addition of the flocculant mixture aggregates the suspension of hydroxide species containing the contaminants and forms very large flocs that are extremely strong and can withstand the highly turbulent flow existing in the well bore.

The flocculant mixture (which may be a solution) which is used to aggregate the hydroxide species and the contaminants into flocs will usually comprise a mixture of a carrier fluid, which makes up the largest percentage by volume of the flocculant mixture, and a polymeric flocculant. The carrier fluid can be any liquid which is miscible with the flocculant and compatible with liquids typically present in an oil well at this stage of operation. A few examples of suitable carrier fluids are aqueous fluids such as water, sea water, and brines containing a salt such as sodium chloride, calcium chloride, potassium chloride, ammonium chloride, potassium carbonate, sodium bromide, calcium bromide, or zinc bromide. Thus, the carrier fluid can be the same as the saline solution which is mixed with the caustic solution, and therefore can be conventional completion fluid. In an off-shore well, the carrier fluid is preferably sea water for reasons of economy.

The polymeric flocculant is not limited to any particular type and may be any polymer which can perform flocculation of the milky suspension of hydroxide species in the presence of the carrier fluid. Polymers which have flocculating properties in aqueous solutions and which can be employed in the present invention include anionic and non-ionic polyacrylamides, polyethylene oxide, polyacrylic acid and its salts, polyamines, and the like. The flocculant can be selected in accordance with the nature of the carrier fluid. When the carrier fluid is sea water or a calcium brine, an example of a suitable polymeric flocculant is a mixture of anionic high molecular weight polyacrylamides with a molecular weight ranging between approximately 200,000 and approximately 2 million and a degree of hydrolysis of approximately 15% to approximately 40%. Such a flocculant is available from Pall Well Technology Filtration Service Company under the trademark Versafloc M341. In a carrier fluid comprising a zinc brine, an example of a suitable polymeric flocculant is a non-ionic high molecular weight polyacrylamide with a molecular weight of approximately 200,000 to approximately 2 million, such as that available from Pall Well Technology Filtration Service Company under the trademark Versafloc M441.

The concentration of the polymeric flocculant in the flocculant mixture will typically be in the range of approximately 1 ppm to approximately 1000 ppm by volume and more preferably in the range of approximately 20 ppm to approximately 100 ppm by volume. If the concentration of the polymeric flocculant is too low, sufficient flocculation will not occur. On the other hand, an excessively high concentration of the polymeric flocculant is economically wasteful. To facilitate mixing the flocculant and the carrier fluid, the flocculant is preferably premixed in a liquid. For example, the polymeric flocculant may be added to water, the concentration of the polymeric flocculant in the water being typically in the range from about 0.1% to about 5% by volume. The premixed flocculant mixture may then be added to the carrier fluid.

The flocculant mixture may contain substances in addition to the carrier fluid and the flocculant, as long as these substances do not impair the performance of the flocculant. For example, it may contain a conventional corrosion inhibitor such as commonly used in oil well workovers.

The flocculant mixture is preferably injected into the well bore soon after the caustic solution is introduced to ensure that the flocculant mixture can mix with the milky suspension and perform the desired flocculation. Namely, if too long of a gap occurs between the introduction of the caustic solution and the introduction of the flocculant mixture, the milky suspension may have dissipated before the flocculant mixture can contact it. Therefore, the flocculant mixture may be added to the well bore immediately after the caustic solution is introduced. Alternatively, a relatively small volume (referred to as a spacer) of a saline solution, such as the completion fluid, may be introduced into the well bore between the caustic solution and the flocculant mixture to ensure that the tail end portion of the caustic solution introduced into the well bore is adequately mixed with saline solution so as to precipitate hydroxide species.

The volume of the flocculant mixture which is circulated through the well will depend upon the size of the well and the amount of particles present in the well. Typically, between 60 barrels and one well volumne of the flocculant mixture will be passed through the well during cleaning. The progress of cleaning by the flocculant mixture can be determined by monitoring the turbidity of fluid discharged from the well head. The turbidity will vary in accordance with the amount of particles being removed from the well by the flocculant mixture. When the turbidity of the discharged fluid decreases to a substantially constant level, most of the particles removable from the well by the flocculant mixture will have been removed, and at this point, circulation of the fluid may be terminated, since additional circulation will not produce a substantial further benefit.

Cleaning a well with a flocculant mixture can be combined with other conventional well cleaning procedures. For example, prior to introducing the caustic solution into the well, it may be desirable to introduce a surfactant or a viscous pill of a material such as hydroxyethylcellulose.

After the introduction of the flocculant mixture, completion fluid may be pumped down the well bore to flush the resulting flocs to the well head.

Typically, during a cleaning operation according to the present invention, fluid will be constantly circulated through the well bore so as to maintain a turbulent flow regime and to minimize the overall time required for cleaning. However, it is also possible to temporarily interrupt pumping of fluid into the well bore.

The fluids employed in the present invention, i.e., the saline solution, the caustic solution, and the flocculant mixture may be introduced into the well bore in a variety of manners. In most completion and workover operations, these fluids are pumped down into the well bore via the production tubing and then circulated back to the surface through the annulus between the production tubing and the casing, since circulating fluids in that direction produces highly turbulent flow which promotes mixing of the flocculant mixture with contaminants in the well bore. However, the caustic solution and the flocculant mixture may be circulated through the well bore in the opposite direction, i.e., down the annulus and then up the production tubing back to the surface.

The fluids can also be introduced by means of coiled tubing fed into the well bore through the production tubing or the annulus. Coiled tubing is a suitable means for introducing fluids when there is no production tubing within the well bore. Coiled tubing is also suitable when it is desired to remove sand bridges or similar obstructions from production tubing, but packers installed in the annulus formed between the casing and the production tubing prevent fluid flow along the annulus. In this case, coiled tubing can be fed down the production tubing to the vicinity of the location which needs to be cleaned, and the fluids can be circulated down through the coiled tubing and then back up to the well head through the inside of the production tubing. Alternatively, fluids may be pumped into the well bore outside of the coiled tubing, and the fluids and flocs may be removed from the well bore via the coiled tubing.

The rate of discharge of the flocculant mixture into the bottom of the well bore is not critical but is preferably high enough that a turbulent flow regime exists within the well bore between the point of introduction of the flocculant mixture and the well head. Turbulence increases the ability of the flocculant mixture to increase the intermixing of the fluid suspension containing hydroxide species and contaminants with the flocculant mixture, dislodges particulate solids from inside the well, and keeps the resulting flocs suspended in the circulating fluid until the flocs are discharged at the well head. If the turbulence within the well bore is too great, the flocs will be torn apart and can not be carried to the well head by the circulating fluids. On the other hand, if there is not enough turbulence, there will be inadequate mixing within the well bore. Accordingly, the flow regime in the well bore preferably has a Reynolds number in the range of approximately 3,000 to approximately 80,000 and more preferably in the range of approximately 20,000 to 30,000.

The temperature of the flocculant mixture during cleaning operation is not critical, but is preferably below the temperature at which the polymeric flocculant degrades.

Upon reaching the top of the well bore, the circulating fluids and the flocs suspended in it are discharged from the well head and then either reclaimed for reuse or disposed of in a suitable manner in accordance with environmental regulations. In an off-shore well, the completion fluid is typically sea water, so the fluids discharged from the well bore can usually be discarded overboard. When the completion fluid is a substance which it is desired to reuse, the fluids discharged from the well can be treated to separate the flocs from the completion fluid. For example, the fluid can be collected in a tank and then passed through any suitable fluid treatment system to remove the flocs or other undesirable substances from the completion fluid by filtering. The fluid which is discharged from the fluid treatment device is suitable for reuse in cleaning the well. Various conventional processes can be performed to treat the completion fluid. For example, flocs can be removed from the completion fluid by settling and/or filtration to obtain particulate solids by a method such as that described in U.S. Pat. No. 4,599,117, for example. The resulting particulate solids can then be safely discharged to the environment.

While polymeric flocculants are quite effective at aggregating isolated contaminant particles within a well bore, they can even more readily aggregate hydroxide species into a floc. Therefore, by first entrapping the contaminant particles in a suspension of hydroxide species and then contacting a flocculant mixture with the suspension, larger flocs containing the contaminants can be formed by the method of the present invention than can be formed in the absence of the hydroxide species. The increase in the size of the flocs increases the fluid drag forces acting thereon, so the flocs can be carried upwards by fluid flow to the well head with a significantly shorter circulation time of fluids through the well bore than in a conventional cleaning method. For example, it is estimated that the circulation time can be decreased by 50%. This decrease is highly advantageous in that it not only decreases material and labor costs, but it also reduces the down-time of the well.

Furthermore, the method of the present invention is very insensitive to the nature of the contaminants present in the well bore. For example, oily solids that are typically difficult to flocculate can be trapped by the suspension of hydroxide species and then easily flocculated.

As mentioned above, in many instances, a conventional completion fluid can be employed as the saline solution for carrying out the method of the present invention. However, there may be some situations in which the completion fluid used in cleaning a well is non-saline or does not contain a sufficient amount of salts capable of reacting with a caustic solution to form the desired suspension of hydroxide species. In such a case, the saline solution can be an aqueous solution different from the completion fluid, and it can be mixed with the caustic solution in the manners described above. For example, the saline solution can be pumped into the well bore to partially displace the non-saline completion fluid, and the caustic solution can be pumped into the well bore immediately after the saline solution so that the two solutions will mix by turbulence. The flocculant mixture can then be pumped into the well bore immediately or soon after the caustic solution.

The method of the present invention is not limited to use in an oil well. For example, it can be used in settling tanks to remove contaminants from waste water. In such a method, a saline solution and a caustic solution could be mixed to form a milky suspension containing hydroxide species and then introduced into the settling tank. The waste water in the settling tank would be stirred or otherwise agitated to contact the suspension with contaminants in the waste water so as to entrap the contaminants. A polymeric flocculant would then be added to the settling tank to aggregate the hydroxides species and the entrapped contaminants into flocs, which could be allowed to settle out and then removed from the settling tank. This process would be extremely effective for the removal of oily solids.

The present invention will be further described by means of the following examples.

EXAMPLE 1

This example illustrates addition of a caustic solution to an off-shore well where sea water is used as a completion fluid. The well bore contains casing and production tubing installed inside the casing.

A caustic (potassium hydroxide or sodium hydroxide) in powder or pellet form is added to a tank containing fresh water (5 m$^3$=approximately 31.4 barrels) to obtain a concentration of 30 kg/m$^3$ (approximately 10 pounds/barrel). This solution is then pumped down the production tubing into the well bore at a flow rate of 0.25 to 1 m$^3$/minute (approximately 1.6 to approximately 6.3 barrels per minute), depending upon the size of the well bore, so as to obtain a Reynolds number of 20,000–30,000 in the annulus defined by the largest casing and the production tubing between the bottom of the production tubing and the well head. The flow rate can be calculated from the formula:

$$Q = \frac{(D + d) \times \eta \times Re}{15915 \times G}$$

wherein
Q: flow rate in barrels per minute
G: fluid density in pounds per gallon
D: maximum inner diameter of casing in inches
d: outer diameter of production tubing in inches
$\eta$: fluid viscosity in centipoise Prior to the introduction of the caustic solution, the sea water completion fluid is circulated through the well bore, so when the caustic solution is introduced, the well bore is filled with sea water.

The flow rate given by the above equation insures highly turbulent flow that will mix the caustic solution with the sea water in the well bore. When the caustic solution contacts the sea water, bivalent and trivalent metal and nonmetal ions present in the sea water (especially Mg) precipitate with the hydroxide groups in the caustic solution to form a milky suspension of hydroxide species that mix with and entrap the contaminants present in the well bore.

Following the caustic solution, a small sea water spacer (5 m$^3$=approximately 31.4 barrels) is pumped down the production tubing, followed by a flocculant mixture comprising a polyacrylamide flocculant at a concentration of approximately 50 ppm in a carrier fluid in the form of sea water, all pumped at the above flow rate. The flocculant mixture mixes with the milky suspension to aggregate the hydroxide species and the entrapped contaminants into large flocs that are very resistant to the turbulent flow. The large flocs are swept up to the surface and discharged from the well head together with the flocculant mixture.

EXAMPLE 2

In this example, the method of the present invention is used to clean a well filled with a liquid, such as fresh water, which has insufficient multivalent ions that will react with a caustic solution to form a milky suspension of hydroxide species. Like the well of Example 1, it has a well bore equipped with casing and production tubing.

An aqueous aluminum sulfate solution having a concentration of 20 kg/m$^3$ is prepared. A caustic solution is also prepared, in the same manner as in Example 1. A 10 m$^3$ (approximately 63 barrels) volume of the aluminum sulfate solution is pumped down the production tubing, which is filled with fresh water, to partially displace or dilute the fresh water in the well bore. Immediately after the aluminum sulfate solution, the caustic solution is pumped down the production tubing. The flow rate is the same as for Example 1. Immediately following the caustic solution, a 5 m$^3$ pill of the aluminum sulfate solution is pumped down the production tubing to ensure that the maximum amount of the caustic solution will react with the aluminum sulfate to form a milky suspension of aluminum hydroxide species. The suspension is mixed with contaminants in the well bore by turbulence to entrap the contaminants. A polymeric flocculant solution containing the same flocculant as in Example 1 but using the completion fluid for the well as a carrier fluid instead of sea water is then pumped down the production tubing. The flocculant solution is mixed with the suspension by turbulence within the well bore and aggregates the aluminum hydroxide species and the entrapped contaminants into large flocs, which are carried to the surface through the annulus between the casing and the production tubing and discharged from the well head.

What is claimed is:

1. A method of cleaning an oil or gas well comprising:
    mixing a caustic with saline solution to precipitate hydroxide species;
    contacting the hydroxide species with contaminants in a well; and
    contacting a polymeric flocculant with the hydroxide species in the well to form a floc containing the hydroxide species and the contaminants.

2. A method according to claim 1, wherein mixing the caustic with saline solution includes forming a milky suspension of hydroxide species.

3. A method according to claim 1 wherein contacting the hydroxide species with contaminants includes contacting the hydroxide species with solid particulate contaminants in the well.

4. A method according to claim 1 wherein contacting the hydroxide species with contaminants includes contacting the hydroxide species with oil droplets or oily solids present in the well.

5. A method according to claim 1 wherein mixing the caustic with saline solution includes mixing the caustic with saline solution outside of the well to form a mixture and wherein contacting the hydroxide species with contaminants includes injecting the mixture of caustic and saline solution into the well.

6. A method according to claim 1 comprising introducing the caustic into the well prior to mixing the caustic with saline solution.

7. A method according to claim 6 wherein mixing the caustic with saline solution includes introducing a first volume of saline solution into the well, then introducing the caustic into the well, and mixing the two solutions by turbulence in the well.

8. A method according to claim 7 further comprising introducing a second volume of saline solution into the well immediately after introducing the caustic and before contacting the flocculant with the hydroxide species.

9. The method of claim 6 wherein the well is substantially filled with the saline solution when the caustic solution is introduced into the well.

10. A method according to claim 1 comprising introducing the caustic, saline solution, or the polymeric flocculant into the well using coiled tubing.

11. A method according to claim 1 including introducing the caustic, saline solution, or the polymeric flocculant into the well at a rate sufficient to create turbulent flow in the well.

12. A method according to claim 10 wherein the turbulent flow has a Reynolds number of approximately 3,000 to approximately 80,000.

13. The method of claim 12 wherein the turbulent flow has a Reynolds number of approximately 20,000 to approximately 30,000.

14. A method according to claim 1 wherein the saline solution comprises sea water.

15. A method according to claim 1 wherein the saline solution comprises a metal brine.

16. A method according to claim 1 wherein the caustic comprises an aqueous solution of a hydroxide.

17. A method according to claim 1 wherein the caustic comprises aqueous potassium hydroxide or aqueous sodium hydroxide.

18. A method according to claim 1 including discharging a floc containing liquid from the well bore and filtering the liquid.

19. The method of claim 1 wherein the saline solution comprises an aqueous solution of chloride, bromide, or carbonate salts.

20. The method of claim 19 wherein the concentration of salts in the aqueous solution is at least 0.1%.

21. The method of claim 20 wherein the concentration of salts in the aqueous solution is at least 2%.

22. The method of claim 1 wherein the saline solution comprises an aqueous well completion fluid.

23. The method of claim 1 wherein the caustic comprises a solid caustic.

24. The method of claim 23 comprising mixing the solid caustic with the saline solution outside the well and then introducing the mixed solid caustic and saline solution into the well.

25. The method of claim 1 wherein precipitating hydroxide species comprises precipitating multivalent metal or non-metal hydroxide species.

26. The method of claim 1 wherein precipitating hydroxide species comprises precipitating calcium, zinc, magnesium, aluminum, or iron hydroxide species.

27. The method of claim 1 wherein mixing the caustic with saline solution comprises mixing the caustic with sea water to precipitate hydroxides from ions in the sea water.

28. The method of claim 1 including introducing a flocculant mixture comprising the polymeric flocculant and a carrier fluid into the well.

29. The method of claim 28 wherein the polymeric flocculant is miscible in the carrier fluid.

30. The method of claim 28 wherein the carrier fluid comprises a saline-solution.

31. The method of claim 30 wherein the carrier fluid comprises aqueous solutions of chloride, bromide, or carbonate salts.

32. The method of claim 30 wherein the carrier fluid comprises sea water.

33. The method of claim 28 wherein a concentration of the polymeric flocculant in the carrier fluid is in the range between about 1 ppm and about 1000 ppm.

34. The method of claim 33 wherein the concentration of the polymeric flocculant in the carrier fluid is between about 20 ppm and about 100 ppm.

35. The method of claim 28 comprising mixing the polymeric flocculant in water and then mixing the polymeric flocculant and the water with the carrier fluid.

36. The method of claim 1 wherein the polymeric flocculant comprises polyacrylamides, polyethylene oxide, polyacrylic acid and its salts, or polyamines.

37. The method of claim 1 wherein the polymeric flocculant comprises anionic or non-ionic polyacrylamides.

38. The method of claim 1 wherein the polymeric flocculant has a molecular weight in the range from about 200,000 to about 2,000,000.

39. The method of claim 1 including adding a surfactant or viscous pill of hydroxyethylcellulose to the well prior to contacting the hydroxide species with contaminants.

40. The method of claim 1 comprising introducing the caustic, the saline solution, and the polymeric flocculant into the well down production tubing and up an annulus surrounding the production tubing.

41. The method of claim 1 comprising introducing the caustic, the saline solution, and the polymeric flocculant into the well down an annulus surrounding production tubing of the well and then up the production tubing.

42. The method of claim 1 comprising introducing the saline solution into the well prior to mixing the saline solution with the caustic.

43. The method of claim 1 wherein the polymeric flocculant has a degree of hydrolysis of approximately 15% to approximately 40%.

44. The method of claim 1 including producing continuous fluid circulation through the well while forming the floc.

45. The method of claim 44 including lifting the floc out of the well by the fluid circulation.

46. The method of claim 1 wherein the well is substantially filled with fresh water prior to the mixing of the caustic with saline solution.

47. A method of removing particulate-containing contaminants from a space comprising:
mixing a caustic with saline solution to form a suspension containing hydroxide species;
contacting the suspension with particulate-containing contaminants in a space to entrap the contaminants;
mixing a polymeric flocculant with the suspension in the space to aggregate the hydroxide species and the particulate-containing contaminants into a floc;
exerting a fluid drag force on the floc with a fluid to transport the floc from the space and thereby increase a rate at which the particulate-containing contaminants leave the space; and
separating the floc from the fluid outside of the space.

48. A method according to claim 47 wherein the contaminants comprise oil droplets or oily solids.

49. A method according to claim 47 wherein the space comprises a region inside a conduit for fluid flow.

50. A method according to claim 49 wherein the space comprises an interior region of tubing.

51. A method according to claim 47 wherein exerting the fluid drag force on the floc inhibits settling of the floc within the fluid.

52. A method according to claim 47 wherein transporting the floc comprises transporting the floc upwards within a well.

53. A method according to claim 47 including passing the fluid through the space before and after mixing the polymeric flocculant with the suspension.

* * * * *

UNITED STATES PATENT AND TRADEMARK OFFICE
CERTIFICATE OF CORRECTION

PATENT NO.    : 5,439,058
DATED         : August 8, 1995
INVENTOR(S)   : Malbrel et al.

It is certified that error appears in the above-indentified patent and that said Letters Patent is hereby corrected as shown below:

Column 10, Line 16, change "10" to --11--;

Line 65, change "saline-solution" to --saline solution--.

Signed and Sealed this

Sixteenth Day of April, 1996

BRUCE LEHMAN

Attest:

Attesting Officer

Commissioner of Patents and Trademarks